United States Patent [19]
Lo et al.

[11] Patent Number: 5,433,022
[45] Date of Patent: Jul. 18, 1995

[54] THREE COLOR SIDE WALL RUBBER SOLE IN SIMPLY CHANGEABLE MODE

[76] Inventors: Chie-Fang Lo, 88-17-1-1, Dong Ping Rd., Tai Ping Hsiang, Taichung County; Chien-Yeh Fang, 14F, No. 55, Lane 106-9, Chungchin Rd., Taichung City, both of Taiwan

[21] Appl. No.: 284,272

[22] Filed: Aug. 2, 1994

Related U.S. Application Data

[63] Continuation of Ser. No. 49,107, Apr. 16, 1993, abandoned.

[51] Int. Cl.⁶ .................. A43B 13/12; A43B 13/04
[52] U.S. Cl. ................... 36/30 R; 36/25 R; 264/244
[58] Field of Search ............. 36/30 R, 31, 114, 25 R; 264/244, 245, 246

[56] References Cited

U.S. PATENT DOCUMENTS

| | | | |
|---|---|---|---|
| 3,042,975 | 7/1962 | Bingham, Jr. et al. | 12/196 W |
| 3,824,716 | 7/1974 | Di Paulo | 36/30 R |
| 3,949,040 | 4/1976 | Drab | 264/244 |
| 4,120,477 | 10/1978 | Justamante | 264/244 |
| 4,236,327 | 12/1980 | Gorsche et al. | 36/17 R |
| 4,307,521 | 12/1981 | Inohara et al. | 36/31 |
| 4,354,318 | 10/1982 | Frederick et al. | 36/30 R |
| 4,398,357 | 8/1983 | Batra | 36/31 |
| 4,542,598 | 9/1985 | Misevich et al. | 36/114 |
| 4,562,606 | 1/1986 | Forschweiler | 264/244 |
| 4,624,061 | 11/1986 | Wezel et al. | 36/31 |
| 4,676,010 | 6/1987 | Cheskin | 36/30 R |
| 4,794,707 | 1/1989 | Franklin et al. | 36/30 R |
| 4,890,398 | 1/1990 | Thomasson | 36/114 |
| 5,131,173 | 7/1992 | Anderie | 36/31 |
| 5,243,772 | 9/1993 | Francis et al. | 36/114 |

FOREIGN PATENT DOCUMENTS

| | | | |
|---|---|---|---|
| 1072032 | 9/1954 | France | 36/30 R |
| 1076500 | 10/1954 | France | 36/17 R |
| 4005902 | 1/1992 | Japan | 36/30 R |
| 2255308 | 11/1992 | United Kingdom | 264/244 |

OTHER PUBLICATIONS

Le Coq Sportif.

*Primary Examiner*—Steven N. Meyers
*Attorney, Agent, or Firm*—Bacon & Thomas

[57] ABSTRACT

The invention offers the three-color-side-wall rubber soles in easily changeable mode. It only referred to the integrated multicolor rubber soles which can be manufactured by a mould set with the changeability of color ring in various series. The invention may be directly applied to the streamline of soles to form shoe modes. The invention may be simply designed. In the meantime, it exprsses the unique characteristic properties.

5 Claims, 11 Drawing Sheets

THREE COLOR SIDE WALL RUBBER SOLE IN SIMPLY CHANGEABLE MODE

This application is a continuation of application Ser. No. 08/049,107, filed Apr. 16, 1993, now abandoned.

BACKGROUND OF THE INVENTION

Shoes are an essential commodity in our daily life. People usually select a pair of shoes in specific color and style, such as the leather shoes, the casual shoes, the sneakers and so on, to match their clothes. There is no doubt that shoes are closely linked to our daily life and people have a considerable demand for various shoes. As a result, shoe manufacturers are devoted to creating uniquely stylish shoes to meet consumers' need. However, to develop a newly designed shoe mode is a time consuming task. It usually needs quite a long time for an acceptable shoe mode to be released to the market. So far, none have expressed the idea of creating any three-color-side-wall sole which provides abundant varieties in color series and modes. Painting colors on outsole to make a new shoe mode has been mentioned before but it requires manual labor which has deterred mass production. In addition, its production cost is too high and the quality is hardly controlled. In particular, water, sunshine, and scraping would decolor those color rings painted by spray painting or transprint. That is totally unacceptable to the modern consumers who require high quality products. To the evolutionary of shoes, the three-color-side-wall sole made in originally colored rubber is a completely new revolution which topples the traditional concept about soles.

Whereas, the inventor spent several years on creating the invention to solve the problems mentioned above. The major purpose for the invention is to provide a three-color-side-wall rubber sole produced by an applicable mould. The invention is composed of a side-wall of three colorful layers, whose colors are easily changed, and a rubber sole. The invention in integrated structure can be manufactured massively and have numerous varieties in modes and color series.

The minor purpose for the invention is to accelerate production as well as to reduce production cost by manufacturing process on mould.

The invention has an additional purpose to eliminate unstable quality of the colored side-wall by using originally colored rubber to make the side-wall.

Another attached advantage of the invention is the practical access to selecting various color series and various streamline soles for shoes.

SUMMARY OF THE INVENTION

The invention is an integrated three-color-side-wall rubber sole in simply changeable mode which can be produced industrially and whose side-wall is made by three layers of color rings to match the streamline design of shoe body as well as to stand out the unique characteristic of the rubber sole.

DETAILS OF THE PREFERRED EMBODIMENT

Figure 1:
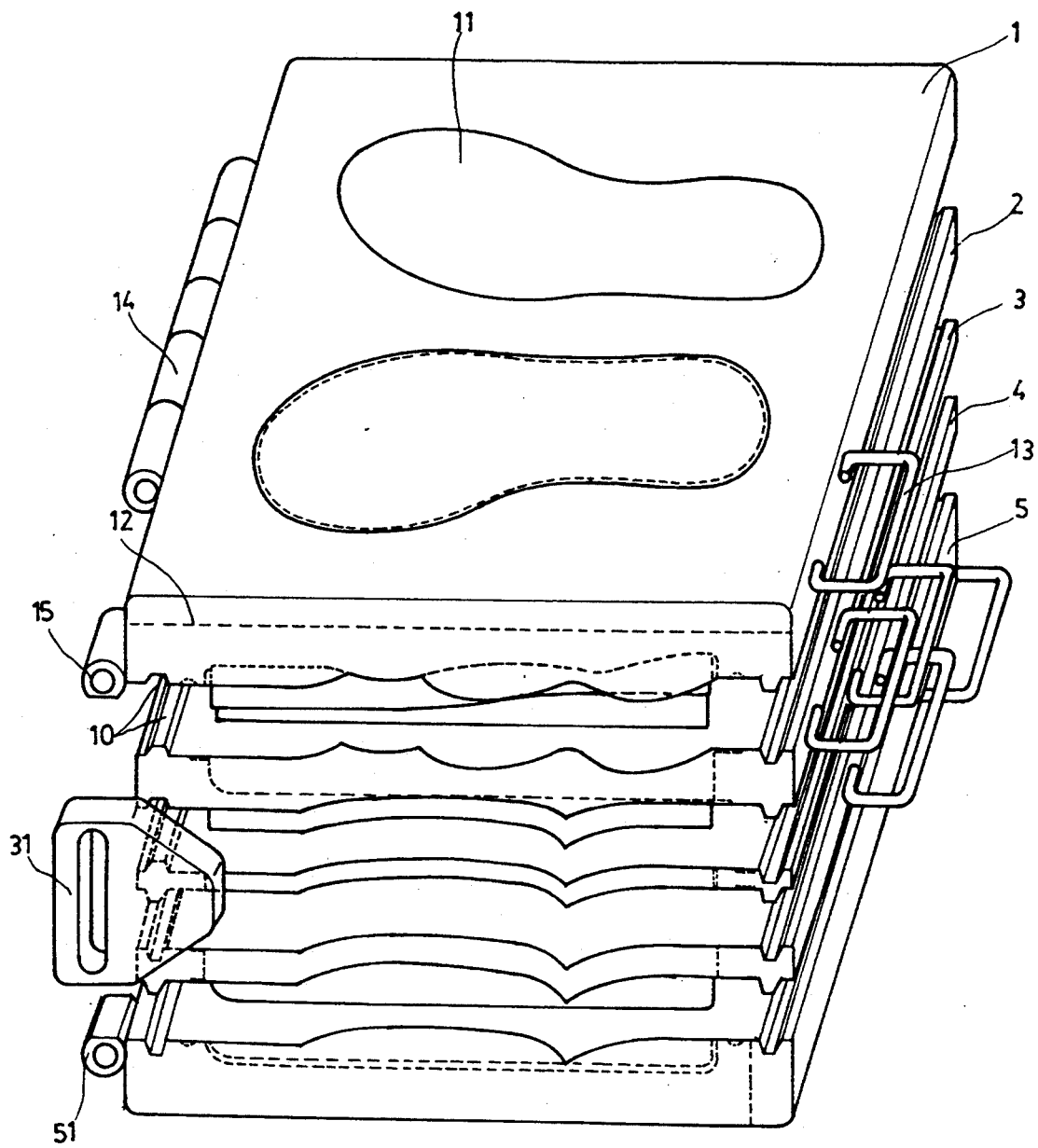
FIG. 1 is the three-dimensional illustration of producing the invention in the mould set.
Figure 2:
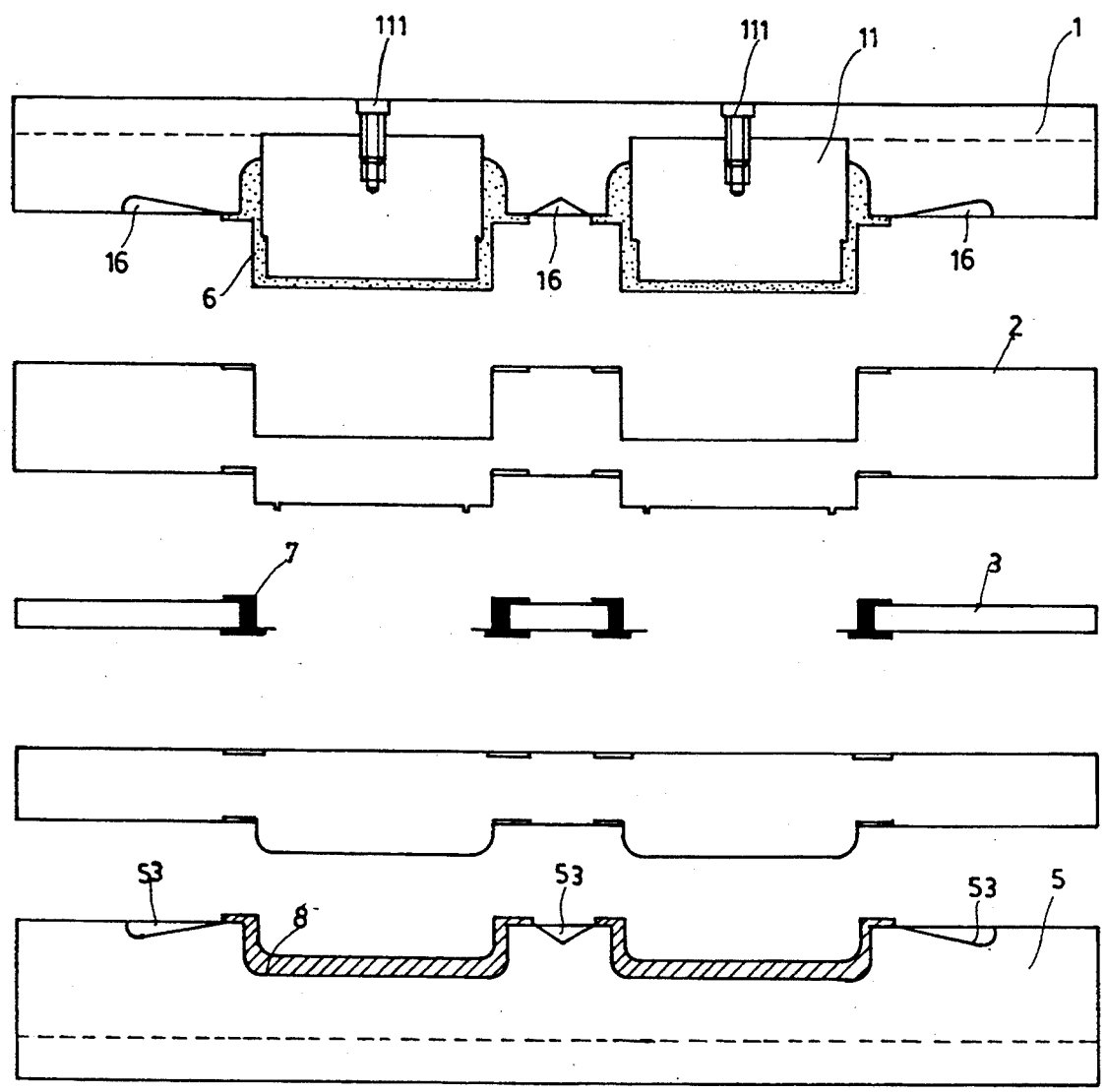
FIG. 2 illustrates the cross section of FIG. 1.
Figure 3:
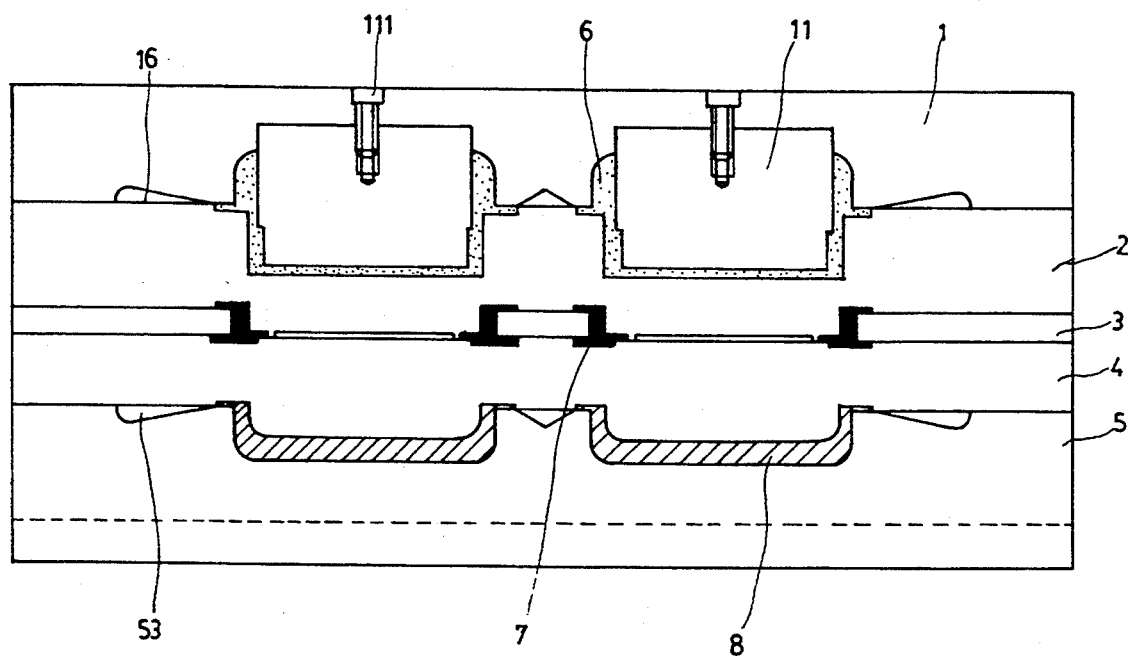
FIG. 3 illustrates the cross section of integrating the parts.
Figure 4:
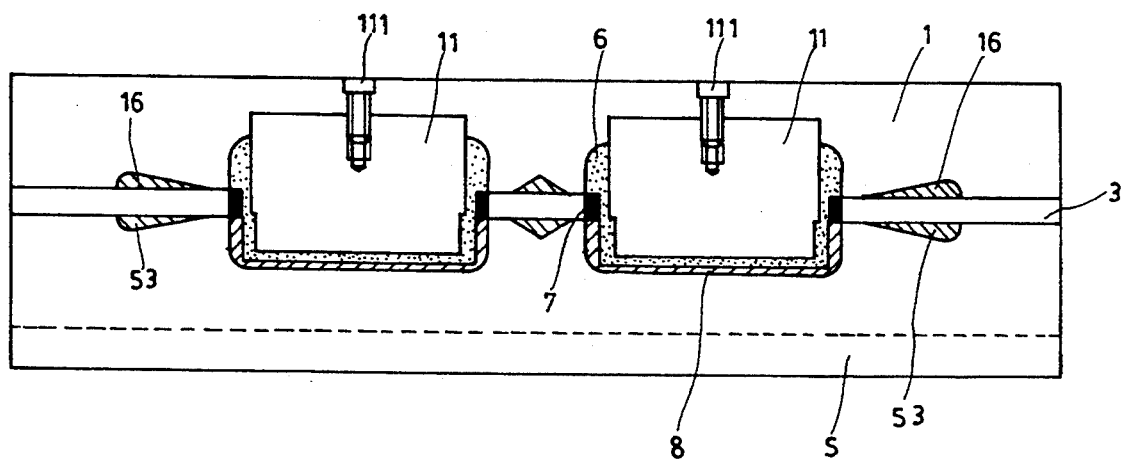
FIG. 4 illustrates the cross section of completely integrated product in the mould set.
Figure 5:
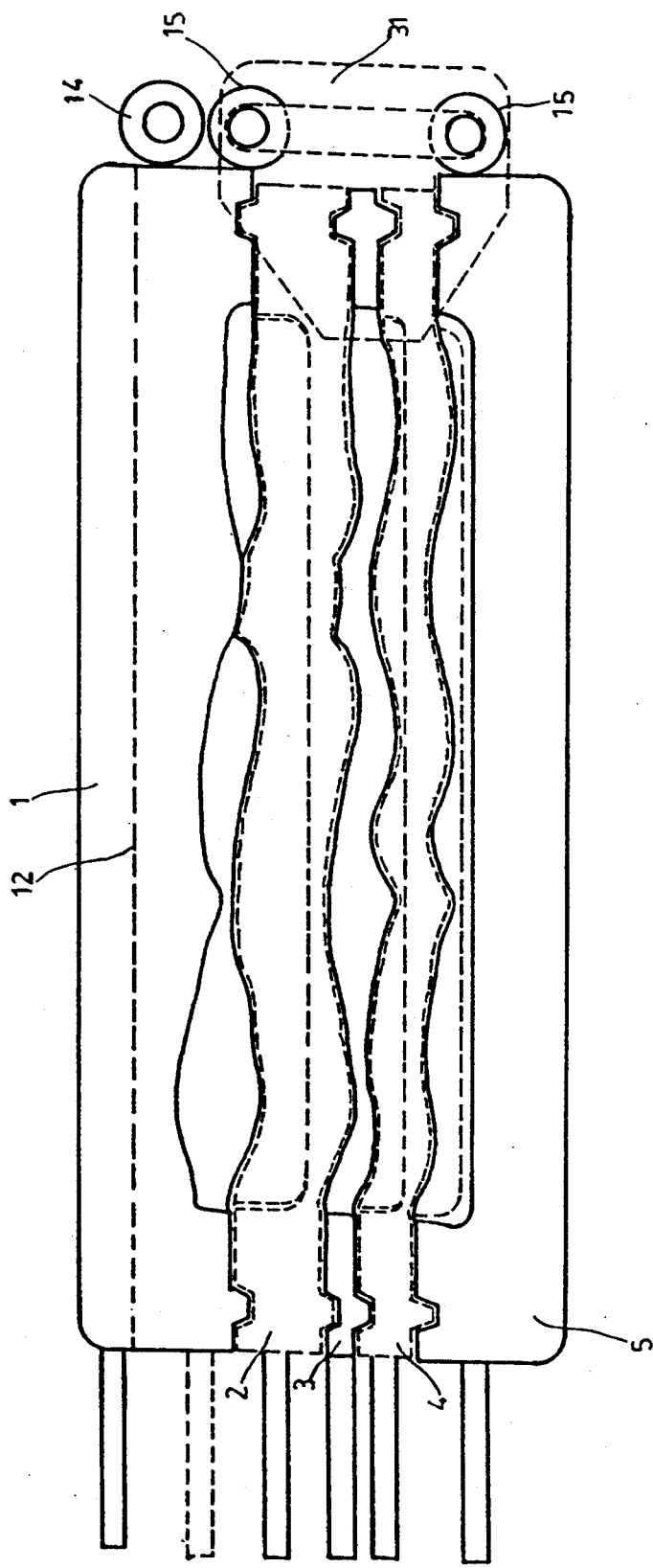
FIG. 5 illustrates the front view of finishing the production.
Figure 6:
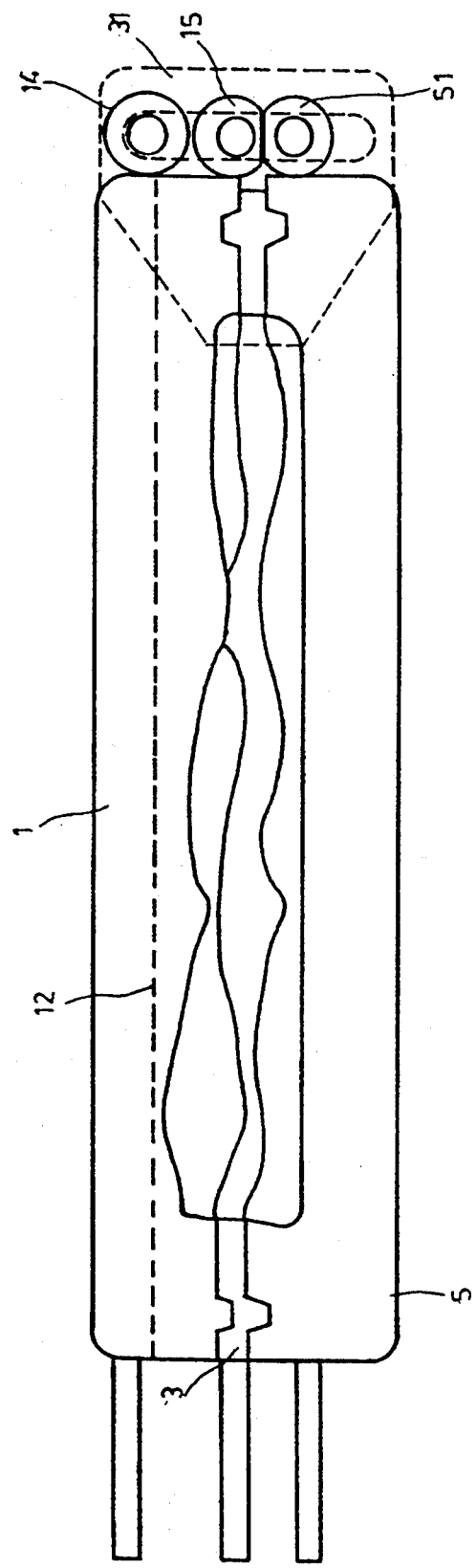
FIG. 6 illustrates the front view of the completed product in the mould set.
Figures 7, 8:
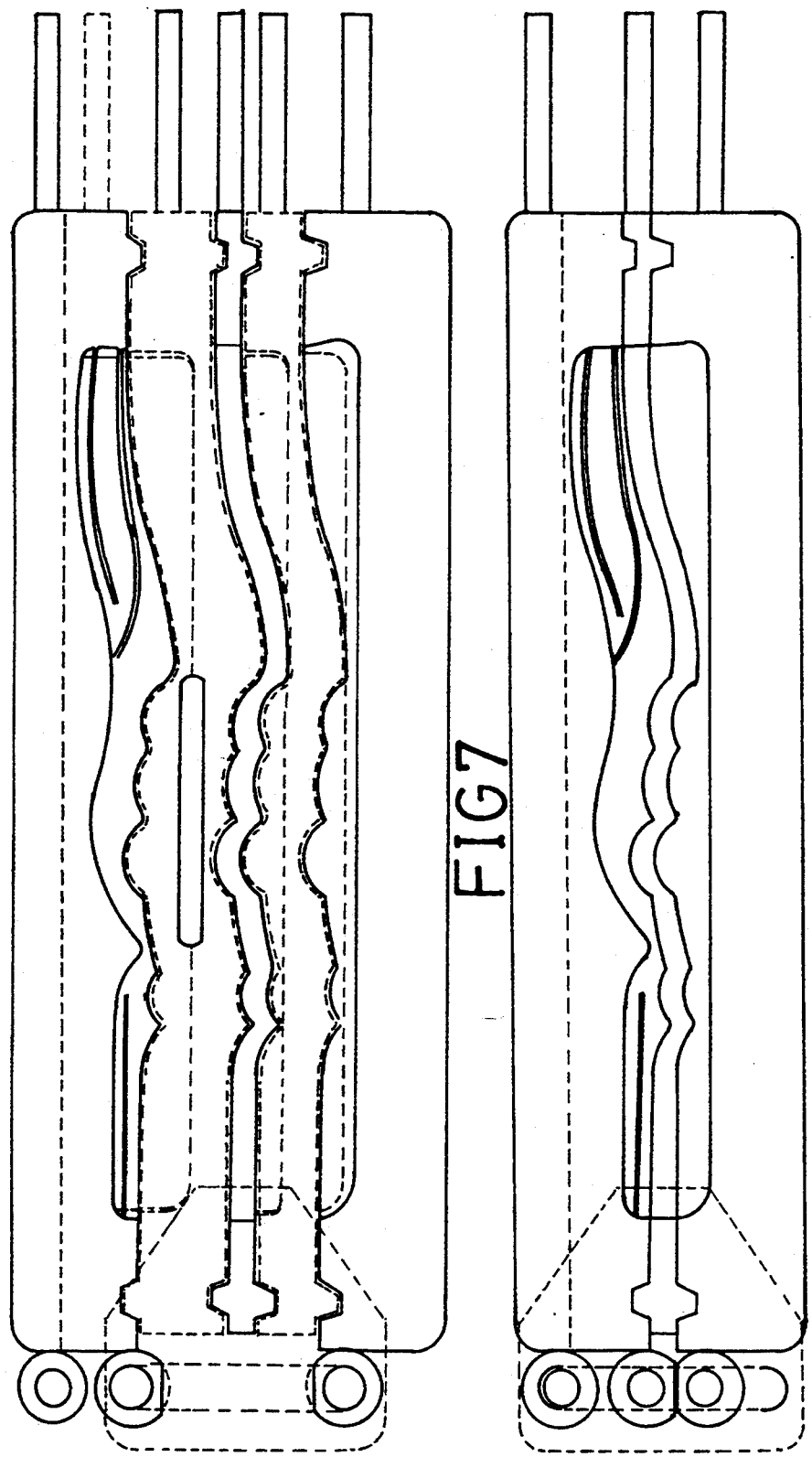
FIG. 7 shows another condition of finishing the production.
FIG. 8 shows another situation of completed product in mould set.
Figure 9:
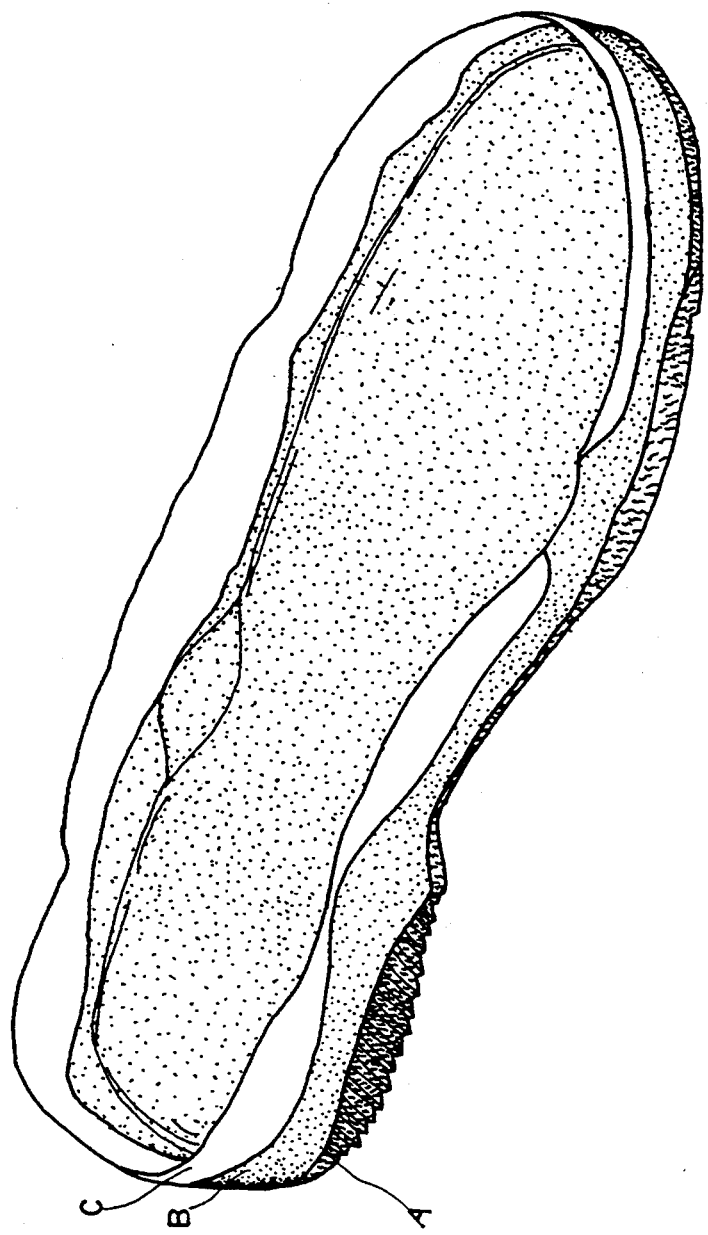
FIG. 9 to FIG. 12 illustrate the produced soles in various modes.
Figure 10:
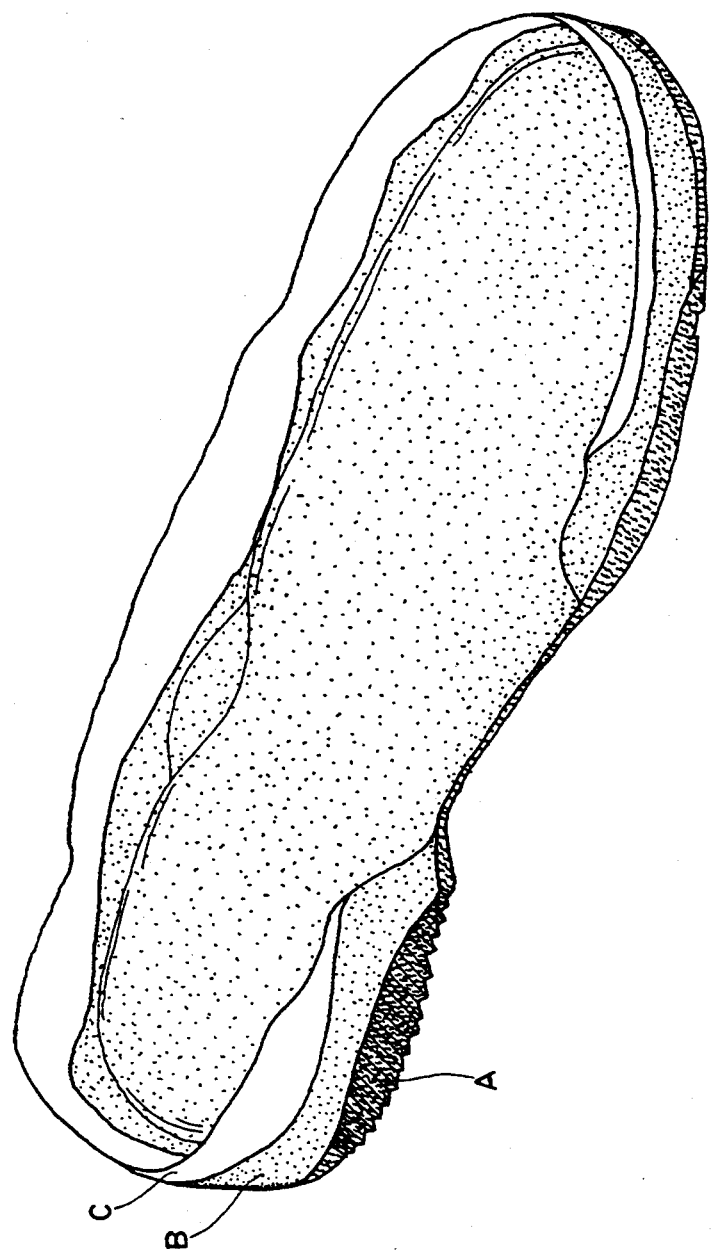
Figure 11:
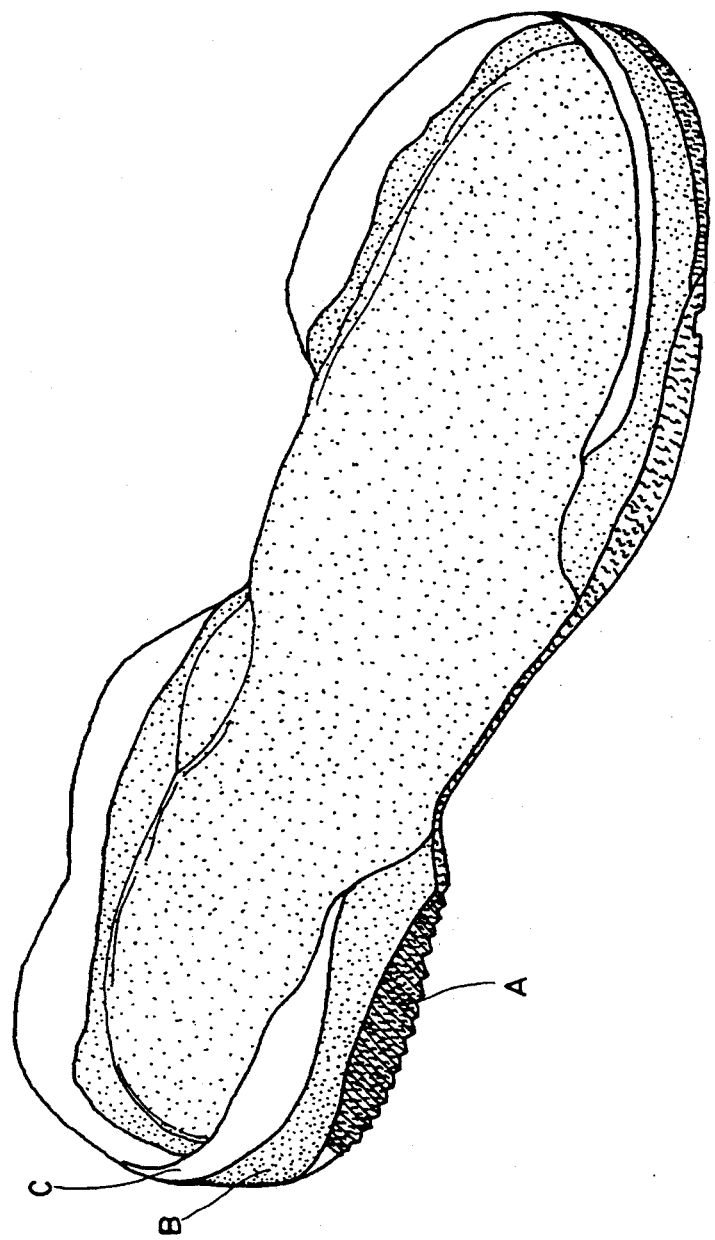
Figure 12:
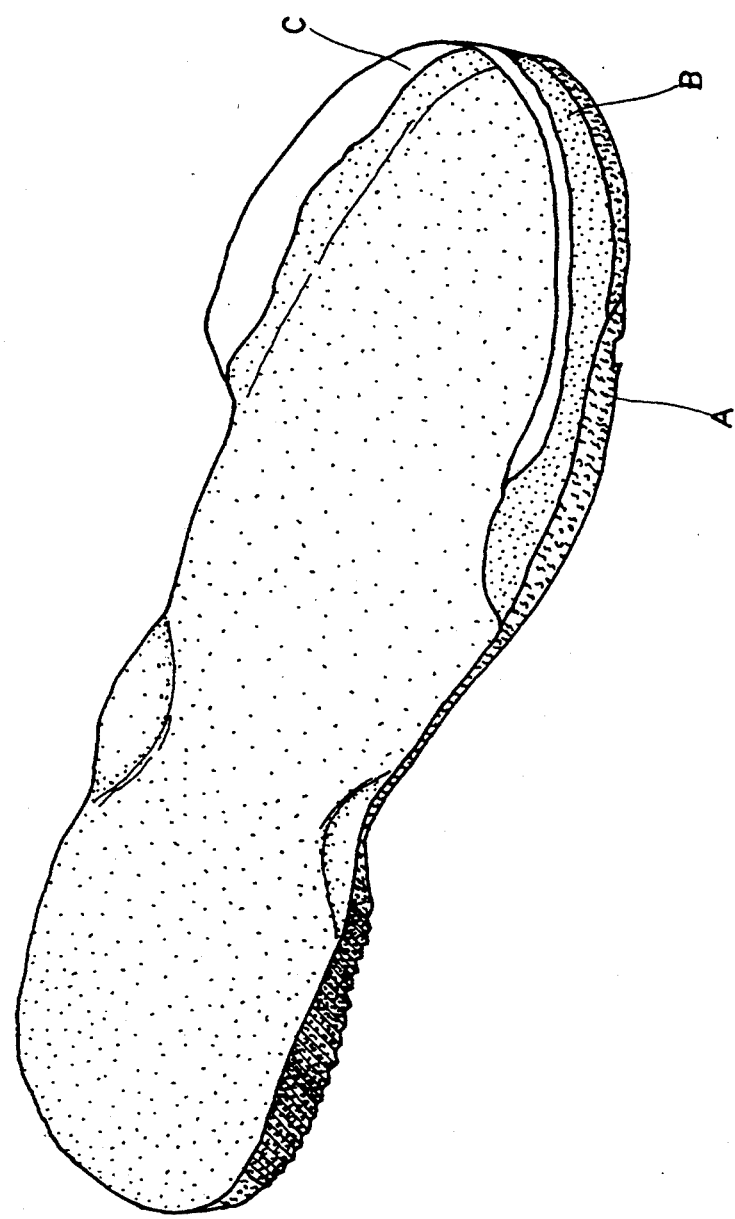

Please refer to FIG. 9 to FIG. 12. The invention has an integrated structure composed of the sole and the side-wall. The colors of the three layers (A)(B)(C) set between the sole and the side-wall are changeable. Before integrating the three colorful layers (A)(B)(C), the silhouette of the layers may be designed to make a remarkable colorful mode. Concerning the production of the invention, please refer to FIG. 1 to FIG. 8. The invention can be manufactured by a mould set including: the upper panel 1, the upper color separating panel 2, the plate of color ring 3, the lower color separating panel 4, the bottom pattern plate 5 and other units. The upper panel 1 has the sole-shaped pressers 11 which are fixed on the upper panel by bolts (111) or by welding. The guarding line of mould separation 12, the movable latch 14 in the extension of the handle 13, joints 15 welded on the lateral sides of the movable latch are all set in the panel. In the front and rear ends of the bottom side of the upper panel connecting the mould set, there is corrugated structure 10 to adjust the combination of the mould set. (In the meantime, mould pins shall be set between the panels and plates which ordinary technology which is omitted here.) The plate of color ring 3 has fixing ears 31 on lateral sides to help it combine with the upper panel 1 and the bottom pattern plate 5 to coordinate the combination. The mould set has hemispherical holes 52 on the bottoms of the invented mould set. The upper panel 1 and the upper color separating panel 2 are working together to form the side-wall 6 almost completely. (The black region of the illustration stands for the rubber sole.) The remainder grooves 16 are set in the edge of presser hole in the upper panel 1. The upper color separating panel 2, the convex mold 21 in the bottom, the plate of color ring 3, and the lower color separating panel 4 make the color 20 ring 7. The lower color separating panel 4 and the bottom pattern plate 5 produce the pattern 8. The bottom pattern plate has remainder grooves too. Combining the mould set may form the side-wall, color rings 7, bottom pattern 8 (Please refer to FIG. 3). By taking off the upper color separating panel 2 and the lower color separating panel 4, the upper panel 1 and the plate of color ring 3 and the bottom pattern plate 5 can be combined together by the joints 15 and fixing ears 31 then it may be treated with sulfonation to complete the production the three-color-side-wall rubber sole (as illustrated in FIG. 4). FIG. 5 and FIG. 6 show the modes with various silhouette lines in the three-layered wave pattern of the sole. FIG. 7 illustrates that the surface of all units of the mould set is determined by the streamline mode of the color ring 7. FIG. 6 indicates the completely produced sole in the mould set. The colors of rubber used as the raw material in the production are at the producer's disposal. Also the wave pattern and the silhouette of the sole is changeable to match each other. Therefore, a lot of varieties are created by matching the color ring with the mode of the sole. That shows one of the significant characteristics of the invention-many varieties. For example, by changing modes and colors of the side-wall to match the sole and the coordinating surface and its colors, the sole modes and color ring modes shown in FIG. 8 FIG. 9 FIG. 10 and FIG. 11 are produced.

It is for sure that the invention has numerous varieties in its modes and colors. The above-mentioned statment is an example in substantial production and would not limit the invention. Hence, any invention within the same originating spirit with various transforms, modulation, and application shall be included in the patent of the invention.

We claim:
1. A three color, molded sole for a shoe comprising:
    a) a first material of a first color having a first sole portion and a first sidewall portion extending upwardly from the first sole portion;
    b) a second material of a second color different from the first color having a second sole portion in contact with the first sole portion and a second sidewall portion extending upwardly from the second sole portion, at least a part of the second sidewall portion extending above the first sidewall portion; and,
    c) a third material of a third color different from the first and second colors having only a third sidewall portion affixed to the first and second sidewall portions such that the first, second and third sidewall portions together form a three color sidewall for the shoe sole.

2. The three color, molded sole of claim 1 wherein the first sole portion has a periphery and the first sidewall portion extends upwardly from around the entire periphery of the first sole portion.

3. The three color, molded sole of claim 1 wherein the second sole portion has a periphery and the second sidewall portion extends upwardly from only a portion of the periphery.

4. The three color, molded sole of claim 1 wherein the second sole portion has a heel portion and a toe portion and the second sidewall portion extends upwardly from the toe portion.

5. The three color, molded sole of claim 4 wherein the second sidewall portion also extends upwardly from the heel portion.

* * * * *